April 2, 1968  T. E. BEDNARSKI  3,376,402
REVERSIBLE ELECTRIC SWITCH WITH LATERALLY EXTENDING REVERSING
MEMBER FOR USE IN PORTABLE ELECTRIC TOOL OR APPLIANCE
Filed Sept. 25, 1967

INVENTOR
THADDEUS E. BEDNARSKI

BY Leonard Bloom

ATTORNEY

United States Patent Office 3,376,402
Patented Apr. 2, 1968

3,376,402
REVERSIBLE ELECTRIC SWITCH WITH LATERALLY EXTENDING REVERSING MEMBER FOR USE IN PORTABLE ELECTRIC TOOL OR APPLIANCE
Thaddeus E. Bednarski, Timonium, Md., assignor to The Black and Decker Manufacturing Company, Towson, Md., a corporation of Maryland
Filed Sept. 25, 1967, Ser. No. 670,093
3 Claims. (Cl. 200—157)

ABSTRACT OF THE DISCLOSURE

A portable electric tool or appliance is provided with a handle having a pistol-grip configuration. The handle has a reversible electric switch mounted therein. The switch is actuated by a sliding trigger. The trigger protrudes forwardly of the handle, and is retractable within the handle upon engagement by the operator's finger. A reversing member is operatively connected to the switch; and the reversing member includes a portion extending laterally of the switch, through an aperture in the side of the handle, for convenient engagement by the operator's thumb.

THE PRIOR ART

The prior art, of which I am aware, is best exemplified by the Kaman Patent 2,744,176 issued on May 1, 1956, and by the Frenzel Patent 3,260,827 issued on July 12, 1966.

In the Kaman patent, a portable electric tool has a reversible electric switch mounted within its conventional pistol-grip handle. The switch is actuated by means of a pivoted trigger adapted to be retracted within the handle upon engagement with the operator's finger. A reversing button is mounted for transverse sliding movement on the handle and, through suitable means, is operatively associated with both the switch and the trigger. This reversing button has end portions, each of which extends laterally beyond the respective side portion of the handle. These end portions of the reversing button are engaged by the operator's thumb and another finger, respectively, in reversing the direction of rotation of the tool. Thus, the Kaman structure does not have its reversing button engaged solely by the operator's thumb, nor is the Kaman structure readily adaptable to the variable-speed switch constructions presently on the market.

In the Frenzel patent, a variable-speed switch is mounted within the pistol-grip handle of a portable electric tool. The switch is provided with a sliding trigger engaged by the operator's finger for actuating the switch and energizing the tool. The switch is further provided with a reversing lever, which may be pivotably mounted relative to the body of the switch. This reversing lever is disposed above the trigger and extends forwardly of the trigger, beneath the motor casing of the tool. As stated in Frenzel, the reversing lever is adapted to be engaged (simultaneously) by the same finger which engages the trigger. Thus, as contemplated by Frenzel, the operator must remove his finger from the trigger in order to engage the reversing lever, and vice-versa. Besides, the mounting of the lever (above and forwardly of the trigger, and beneath the motor casing) provides a somewhat cumbersome arrangement, one which precludes a quick and convenient control over the trigger and reversing member, respectively.

OBJECTS OF THE DISCLOSURE

Accordingly, it is an object of the present to alleviate the deficiencies of the prior art by providing, for use in a portable electric tool or appliance, a reversible electric switch having a laterally-extending pivotably-mounted reversing member, one which extends through an aperture in the side of the handle for convenient engagement by the operator's thumb.

It is another object of the present invention to provide a reversible switch means which may be constructed easily and economically, and which may be readily-mounted within the pistol-grip handle of a portable electric tool or appliance.

It is yet another object to provide a reversible switch means for a portable electric tool or appliance, wherein the operator's finger engages the trigger while his thumb engages a laterally-extending pivotably-mounted reversing member, thereby respectively facilitating convenient control over the energization of the tool and instant reversibility from "forward" to "reverse," and vice-versa.

These and other objects of the present invention will become apparent from a reading of the following specification, taken in conjunction with the enclosed drawings:

DETAILED DESCRIPTION

Figure 1:
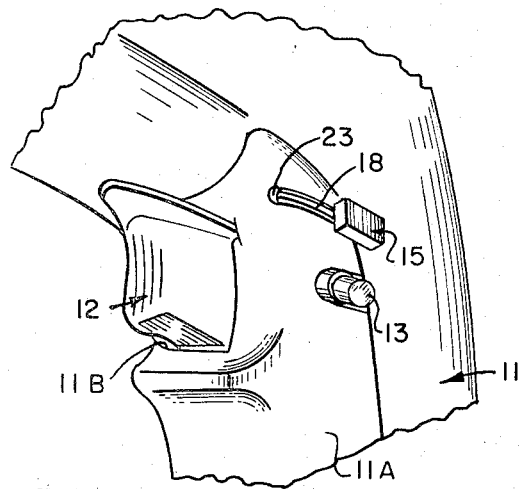
FIGURE 1 is a partial perspective view of a preferred embodiment of a pistol-grip handle for a portable electric tool, the view showing: the sliding trigger adapted for retraction within the handle; a conventional lock-pin button; and the reversing member of the present disclosure, the latter member extending laterally through a slotted aperture in the handle for movement therein longitudinally of the tool.
Figure 2:
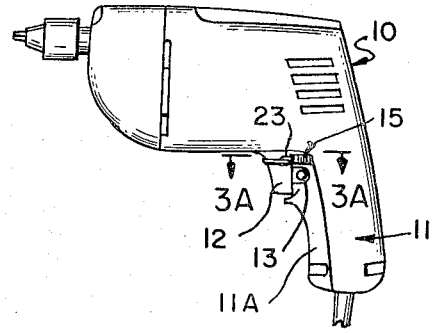
FIGURE 2 is a side elevation, showing the complete tool with which the invention finds particular utility.

With reference to FIGURES 1 and 2, there is illustrated a portable electric drill 10 having a handle 11. The handle has a pistol-grip configuration adapted to be grasped by the opeartor's hand, and the handle may include a forward portion 11A, known in the art as a "switch cover." This switch cover has an opening 11B to receive a sliding trigger 12. The trigger is disposed forwardly of the handle, and is retractable within the handle upon engagement by the operator's finger. A conventional lock-pin 13 extends laterally of the handle for locking the trigger in its retracted position.

Figure 3A:
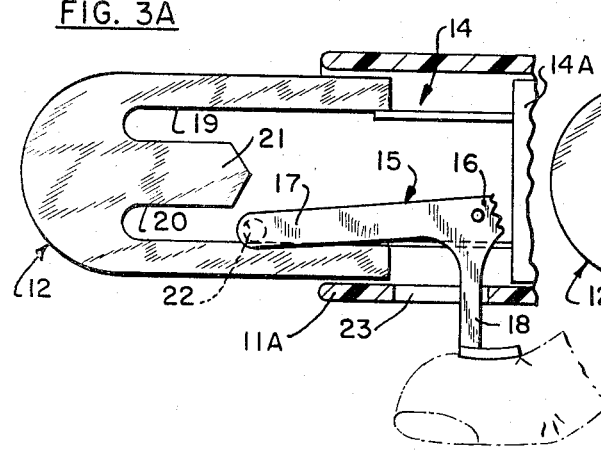
FIGURE 3a is a section view, drawn to an enlarged scale, and taken along the lines 3A—3A of FIGURE 2.
Figure 3B:
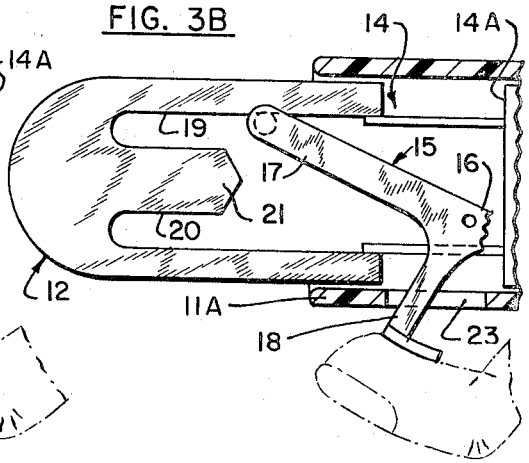
FIGURE 3b is a section view, corresponding generally to that of FIGURE 3a, but showing the pivotably-mounted reversing member in its alternate position.

With further reference to FIGURES 3a and 3b, a switch 14 has its body portion 14A mounted within the tool handle. The switch is of the reversible type, and preferably comprises a variable-speed reversing switch. The trigger and lock pin are each operatively connected to the switch body. The details of the construction of the switch, its trigger and lock pin, are conventional and form no part of the present invention.

A reversing member 15 has in intermediate portion 16 pivotably mounted on the switch body for movement in a plane transverse to the sliding movement of the trigger. The reversing member 15 is operatively associated with (or connected to) the switch body by any suitable means, such as illustrated in the Frenzel patent. Thus, the reversing member is adapted to reverse the internal contacts of the switch (not shown) for the purpose of reversing the direction of current flow to the tool motor (also not shown) in a manner understood by those skilled in the art.

Figure 4:
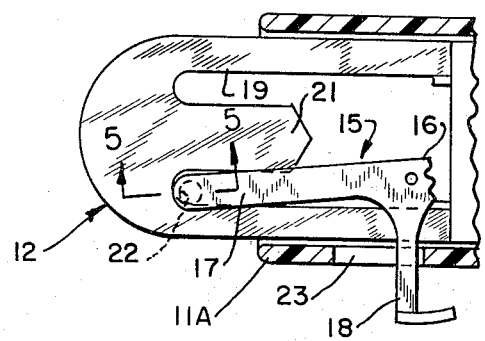
FIGURE 4 is a view, corresponding generally to that of FIGURE 3a, but showing the trigger in its retracted position.
Figure 5:
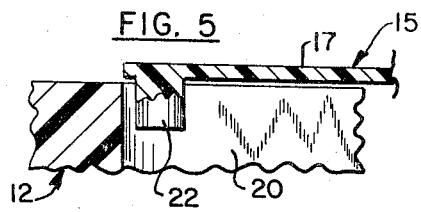
FIGURE 5 is a section view, drawn to an enlarged scale, taken along the lines 5—5 of FIGURE 4, and showing one means for interlocking the sliding trigger with the pivoted reversing member.

With further reference to FIGURES 4 and 5, the reversing member 15 has respective leg portions 17 and 18 extending from its pivotally-mounted intermediate portion 16. One of the leg portions 17, is provided with an interlocking means with the sliding trigger 12. Any suitable interlocking means may be employed, such as parallel slots 19 and 20 formed internally of the sliding trigger, an abutment 21 between the slots, and a pin 22 depending from the leg portion 17 for relative sliding movement within one of the parallel, internal slots 19, 20 formed in the trigger. Thus, the pivotably-mounted reversing member 15 is precluded from movement whenever the trigger 12 is depressed or retracted within the handle 11.

The other leg portion 18 of the reversing member 15 extends laterally of the switch body and through a slotted aperture 23 formed in the side of the handle 11. Preferably, the slotted aperture 23 is formed in the switch cover 11A, thereby facilitating convenient assembly of the entire switch "package" within the handle of the tool.

In operation, as shown by the broken lines in FIGURES 3a and 3b, the operator's thumb may engage the leg portion 18 of the reversing member for movement from "forward" to "reverse," and vice-versa. In its movement, which is pivoted and in a plane transverse to the sliding movement of the trigger, the leg portion 18 is moved along the slotted aperture 23 (from substantially one end of the aperture to the other) in a direction which is generally longitudinally of the tool.

Thus, unlike the prior art teachings, the operator's finger may remain on the trigger 12, his grasp on the piston-grip handle 11 may be maintained, and his thumb (and thumb only) may conveniently engage the reversing member 15 for quickly reversing the direction of rotation of the drill.

Moreover, and preferably, the reversing member 15 is made of a molded-plastic material so as not to interfere with the double-insulation qualities of the drill. Also, the reversing member 15 extends laterally of the side portion of the handle, but within the contour formed therein, thereby precluding the possibility of accidental damage to the reversing member.

Obviously, many modifications may be made without departing from the basic spirit of the present invention; and accordingly, within the scope of the appended claims, the invention may be practiced other than has been specifically described herein.

I claim:

1. In a portable electric tool, the combination of a handle having a pistol-grip configuration adapted to be grasped by the operator's hand, reversible switch means mounted within the handle, the switch including a movable trigger, the trigger extending beyond the handle and being retractable within the handle upon engagement by the operator's finger, a reversing member operatively associated with the switch, the reversing member having an intermediate portion pivotably mounted relative to the handle and further having respective leg portions extending from its pivotably-mounted intermediate portion, interlocking means between the trigger and one of the leg portions of the reversing member, thereby preventing pivotal movement of the reversing member whenever the trigger is retracted within the handle, the handle having a side portion with an aperture formed therein, and the other leg portion of the reversing member extending through the aperture for convenient engagement by the operator's thumb.

2. In a portable electric tool, the combination of a handle having a pistol-grip configuration adapted to be grasped by the operator's hand, a reversible variable-speed switch mounted within the handle, a movable trigger operatively connected to the switch means, the trigger protruding forwardly of the handle and being retractable within the handle upon engagement by the operator's finger, thereby varying the speed of the tool, a reversing member operatively associated with the switch, the reversing member being mounted for movement in a plane transverse to the movement of the trigger, the reversing member having respective portions, interlocking means between the trigger and one of the respective portions of the reversing member, thereby preventing movement of the reversing member whenever the trigger is retracted within the handle, the handle having a side portion with a slotted aperture formed therein, and the other respective portion of the reversing member extending through the slotted aperture for engagement by the operator's thumb, whereby said other respective portion of the reversing member may be conveniently moved along the slotted aperture, substantially from one end of the aperture to the other and longitudinally of the tool, in reversing the direction of rotation of the tool.

3. In a reversible electric switch having a switch body adapted for mounting within the handle of a portable electric tool or appliance, the improvement of a reversing member having an intermediate portion and a pair of respective leg portions extending from its intermediate portion, a trigger slidably mounted on the switch body, the trigger being retractable within the handle upon engagement with the operator's finger, means pivotably mounting the intermediate portion of the reversing member upon the switch body for movement in a plane transverse to the sliding movement of the trigger, interlocking means between the trigger and one of the leg portions of the reversing member, thereby preventing pivotal movement of the reversing member whenever the trigger is retracted within the handle, and the other leg portion of the reversing member extending laterally of the switch body and through an aperture in the handle for convenient engagement by the operator's thumb.

References Cited

UNITED STATES PATENTS

| 2,744,176 | 5/1956 | Kaman | 200—157 |
| 3,260,827 | 7/1966 | Frenzel | 200—157 |
| 3,263,320 | 8/1966 | Jones | 29—423 |
| 3,352,368 | 11/1967 | Maffey | 173—169 |

ROBERT K. SCHAEFER, *Primary Examiner.*

H. BURKS, *Assistant Examiner.*